(12) United States Patent
Vu et al.

(10) Patent No.: US 11,539,908 B2
(45) Date of Patent: Dec. 27, 2022

(54) ADJUSTABLE MODULATION CODING SCHEME TO INCREASE VIDEO STREAM ROBUSTNESS

(71) Applicant: Advanced Micro Devices, Inc., Sunnyvale, CA (US)

(72) Inventors: Ngoc Vinh Vu, Cupertino, CA (US); Adam William Lynch, Melbourne (AU); Darren Rae Di Cera, Reservoir (AU); Stephen Mark Ryan, Lilydale (AU)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/721,125

(22) Filed: Sep. 29, 2017

(65) Prior Publication Data
US 2019/0104276 A1 Apr. 4, 2019

(51) Int. Cl.
*H04N 5/40* (2006.01)
*H04N 19/36* (2014.01)
(Continued)

(52) U.S. Cl.
CPC ............. *H04N 5/40* (2013.01); *H04L 1/0003* (2013.01); *H04L 1/0009* (2013.01);
(Continued)

(58) Field of Classification Search
CPC .......... H04N 5/40; H04N 5/4401; H04N 5/46; H04N 2007/243
(Continued)

(56) References Cited

U.S. PATENT DOCUMENTS 5,335,010 A 8/1994 Lindemeier et al.
5,818,543 A 10/1998 Lee
(Continued)

FOREIGN PATENT DOCUMENTS

JP 2010212942 A 9/2010
JP 2011502405 A 1/2011
(Continued)

OTHER PUBLICATIONS

International Search Report and Written Opinion in International Application No. PCT/US2018/052350, dated Dec. 14, 2018, 13 pages.
(Continued)

*Primary Examiner* — Richard T Torrente
(74) *Attorney, Agent, or Firm* — Kowert Hood Munyon Rankin and Goetzel PC; Rory D. Rankin

(57) ABSTRACT

Systems, apparatuses, and methods for utilizing different modulation coding schemes (MCSs) for different components of a video stream are disclosed. A system includes a transmitter sending a video stream over a wireless link to a receiver. The transmitter splits the video stream into low, medium, and high quality components, and then the transmitter modulates the different components using different MCS's. For example, the transmitter modulates the low quality component using a lower, robust MCS level to increase the likelihood that this component is received. Also, the medium quality component is modulated using a medium MCS level and the high frequency component is modulated using a higher MCS level. If only the low quality component is received by the receiver, then the receiver reconstructs and displays a low quality video frame from this component, which avoids a glitch in the display of the video stream.

20 Claims, 9 Drawing Sheets

(51) Int. Cl.
  *H04N 19/187* (2014.01)
  *H04N 19/66* (2014.01)
  *H04N 19/30* (2014.01)
  *H04L 1/00* (2006.01)
  *H04N 19/29* (2014.01)
  *H04N 19/67* (2014.01)
  *H04N 21/426* (2011.01)
  *H04N 5/46* (2006.01)
  *H04N 1/00* (2006.01)
  *H04N 21/63* (2011.01)
  *H04N 7/24* (2011.01)

(52) U.S. Cl.
  CPC .............. *H04L 1/0086* (2013.01); *H04N 5/46* (2013.01); *H04N 19/187* (2014.11); *H04N 19/29* (2014.11); *H04N 19/30* (2014.11); *H04N 19/36* (2014.11); *H04N 19/66* (2014.11); *H04N 19/67* (2014.11); *H04N 21/426* (2013.01); *H04N 1/00214* (2013.01); *H04N 21/631* (2013.01); *H04N 2007/243* (2013.01)

(58) Field of Classification Search
  USPC ........................................................ 375/240.1
  See application file for complete search history.

(56) References Cited

U.S. PATENT DOCUMENTS

| | | | |
|---|---|---|---|
| 5,860,056 A | 1/1999 | Pond | |
| 6,414,960 B1 | 7/2002 | Kuhn et al. | |
| 7,336,959 B2 | 2/2008 | Khitrik et al. | |
| 7,479,981 B2 | 1/2009 | Tierney et al. | |
| 7,596,359 B2 | 9/2009 | Kimoto et al. | |
| 7,715,634 B2 | 5/2010 | Lei et al. | |
| 7,881,258 B2 | 2/2011 | Gilbert et al. | |
| 8,300,563 B2 * | 10/2012 | Krishnaswamy | H04L 1/0003 370/310 |
| 8,365,238 B2 | 1/2013 | Reznic et al. | |
| 8,422,961 B2 | 4/2013 | Kafle | |
| 8,457,026 B1 | 6/2013 | Ho et al. | |
| 8,976,220 B2 | 3/2015 | Maxwell | |
| 9,450,620 B1 | 9/2016 | Ahmed et al. | |
| 9,716,537 B2 | 7/2017 | Mammoser et al. | |
| 9,786,985 B2 | 10/2017 | Kim et al. | |
| 9,799,954 B2 | 10/2017 | Preradovic et al. | |
| 9,948,413 B1 | 4/2018 | Zhou et al. | |
| 10,312,980 B2 | 6/2019 | Maamari et al. | |
| 10,523,295 B2 | 12/2019 | Kasher et al. | |
| 10,582,458 B2 | 3/2020 | Sadek et al. | |
| 10,680,927 B2 | 6/2020 | Vu | |
| 10,871,559 B2 | 12/2020 | Vu et al. | |
| 10,959,111 B2 | 3/2021 | Stark, Jr. et al. | |
| 2003/0072376 A1* | 4/2003 | Krishnamachari | H04L 1/0003 375/240.26 |
| 2004/0081238 A1 | 4/2004 | Parhy | |
| 2004/0196919 A1 | 10/2004 | Mehta et al. | |
| 2004/0204103 A1 | 10/2004 | Rouphael | |
| 2005/0185097 A1 | 8/2005 | Takatori et al. | |
| 2006/0017843 A1 | 1/2006 | Shi et al. | |
| 2006/0209890 A1 | 9/2006 | MacMullan et al. | |
| 2006/0209892 A1 | 9/2006 | MacMullan et al. | |
| 2006/0212911 A1 | 9/2006 | MacMullan et al. | |
| 2006/0262985 A1* | 11/2006 | Chen | H04N 19/18 375/E7.199 |
| 2007/0147492 A1 | 6/2007 | Marquant et al. | |
| 2007/0223380 A1 | 9/2007 | Gilbert et al. | |
| 2008/0064425 A1 | 3/2008 | Kim et al. | |
| 2008/0088635 A1 | 4/2008 | Callway et al. | |
| 2008/0144713 A1 | 6/2008 | Kimmich et al. | |
| 2008/0159180 A1* | 7/2008 | Civanlar | H04L 12/1863 370/261 |
| 2009/0150943 A1 | 6/2009 | Vasudevan et al. | |
| 2009/0213940 A1 | 8/2009 | Steinbach et al. | |
| 2010/0009635 A1 | 1/2010 | Qin et al. | |
| 2010/0150252 A1* | 6/2010 | Camp, Jr. | H04L 65/4015 375/240.27 |
| 2010/0214169 A1 | 8/2010 | Kafle | |
| 2011/0058104 A1 | 3/2011 | Arai | |
| 2011/0070928 A1 | 3/2011 | Hsu et al. | |
| 2011/0129025 A1 | 6/2011 | Jaeckel et al. | |
| 2011/0151790 A1 | 6/2011 | Khandekar et al. | |
| 2011/0286545 A1 | 11/2011 | Guignard et al. | |
| 2012/0276896 A1 | 11/2012 | Ren et al. | |
| 2012/0307934 A1 | 12/2012 | Heidari et al. | |
| 2012/0327115 A1 | 12/2012 | Chhetri et al. | |
| 2013/0115887 A1 | 5/2013 | Kwon et al. | |
| 2013/0194950 A1 | 8/2013 | Haghighat et al. | |
| 2013/0242117 A1 | 9/2013 | Luo et al. | |
| 2014/0010319 A1 | 1/2014 | Baik et al. | |
| 2014/0126620 A1 | 5/2014 | Maltsev et al. | |
| 2014/0266900 A1 | 9/2014 | Kasher | |
| 2014/0269937 A1 | 9/2014 | Wadsworth et al. | |
| 2014/0368667 A1 | 12/2014 | Peterson et al. | |
| 2015/0110167 A1 | 4/2015 | Chen et al. | |
| 2015/0289147 A1 | 10/2015 | Lou et al. | |
| 2015/0333994 A1 | 11/2015 | Gell et al. | |
| 2015/0341646 A1 | 11/2015 | Sze et al. | |
| 2016/0105229 A1 | 4/2016 | Trainin et al. | |
| 2016/0134485 A1 | 5/2016 | Thapliya et al. | |
| 2016/0149633 A1 | 5/2016 | Sanderovich et al. | |
| 2016/0227229 A1* | 8/2016 | Wadsworth | H04N 19/30 |
| 2016/0227432 A1 | 8/2016 | Freeman et al. | |
| 2016/0301770 A1 | 10/2016 | Marra et al. | |
| 2016/0337150 A1* | 11/2016 | Larsson | H04L 1/0026 |
| 2017/0026263 A1 | 1/2017 | Gell et al. | |
| 2017/0054991 A1* | 2/2017 | Tsukagoshi | H04N 19/188 |
| 2017/0127408 A1 | 5/2017 | Du | |
| 2017/0134076 A1 | 5/2017 | Maamari et al. | |
| 2017/0141885 A1* | 5/2017 | Bontu | H04L 5/006 |
| 2017/0156067 A1 | 6/2017 | Huang | |
| 2017/0187437 A1 | 6/2017 | Cariou et al. | |
| 2017/0207839 A1 | 7/2017 | Eitan et al. | |
| 2017/0222704 A1 | 8/2017 | Eitan et al. | |
| 2017/0251484 A1 | 8/2017 | Negus et al. | |
| 2017/0264350 A1 | 9/2017 | Sanderovich et al. | |
| 2018/0027420 A1 | 1/2018 | Takahashi et al. | |
| 2018/0062719 A1 | 3/2018 | Verma et al. | |
| 2018/0074188 A1 | 3/2018 | Polo et al. | |
| 2018/0091819 A1* | 3/2018 | Cook | H04N 19/30 |
| 2018/0093177 A1 | 4/2018 | Tokubo | |
| 2018/0123901 A1 | 5/2018 | Yermakov et al. | |
| 2018/0137412 A1 | 5/2018 | Nikkhah et al. | |
| 2018/0198506 A1 | 7/2018 | Sanderovich et al. | |
| 2018/0199256 A1 | 7/2018 | Sanderovich et al. | |
| 2018/0205423 A1 | 7/2018 | Sanderovich et al. | |
| 2018/0227027 A1 | 8/2018 | Kasher et al. | |
| 2018/0234860 A1 | 8/2018 | Kasher et al. | |
| 2018/0248603 A1 | 8/2018 | Kasher et al. | |
| 2018/0288635 A1 | 10/2018 | Kaushik et al. | |
| 2019/0036572 A1 | 1/2019 | Kasher et al. | |
| 2019/0068473 A1 | 2/2019 | Vu et al. | |
| 2019/0068926 A1 | 2/2019 | Vu et al. | |
| 2019/0101638 A1 | 4/2019 | Vu et al. | |
| 2019/0104458 A1 | 4/2019 | Svennebring et al. | |
| 2019/0158156 A1 | 5/2019 | Da Silva et al. | |
| 2019/0173544 A1 | 6/2019 | Vu et al. | |
| 2019/0199467 A1 | 6/2019 | Vu | |
| 2019/0215256 A1 | 7/2019 | Dhanabalan et al. | |
| 2019/0230185 A1 | 7/2019 | Dhanabalan et al. | |
| 2019/0261209 A1 | 8/2019 | Balasubramanian et al. | |
| 2019/0364449 A1 | 11/2019 | Yang et al. | |
| 2020/0280862 A1 | 9/2020 | Stark, Jr. et al. | |

FOREIGN PATENT DOCUMENTS

| | | |
|---|---|---|
| JP | 2011526102 A | 9/2011 |
| WO | 2009156366 A1 | 12/2009 |
| WO | 2011087905 A1 | 7/2011 |

(56) References Cited

OTHER PUBLICATIONS

Van Der Schaar et al., "Robust Transmission of MPEG-4 Scalable Video Over 4G Wireless Networks", International Conference on Image Processing, Sep. 22, 2002, pp. 757-760, vol. 3, IEEE.
Non-Final Office Action in U.S. Appl. No. 15/686,927, dated Nov. 1, 2017, 16 pages.
Final Office Action in U.S. Appl. No. 15/686,927, dated Feb. 27, 2018, 15 pages.
Non-Final Office Action in U.S. Appl. No. 15/686,927, dated Aug. 8, 2018, 19 pages.
Final Office Action in U.S. Appl. No. 15/686,927, dated Jan. 17, 2019, 17 pages.
Non-Final Office Action in U.S. Appl. No. 15/686,934, dated Jan. 25, 2019, 8 pages.
Non-Final Office Action in U.S. Appl. No. 15/832,448, dated Feb. 1, 2019, 15 pages.
International Search Report and Written Opinion in International Application No. PCT/US2018/052373, dated Jan. 7, 2019, 13 pages.
Vu, Ngoc Vinh, U.S. Appl. No. 15/852,833, entitled "Video Codec Data Recovery Techniques for Lossy Wireless Links", filed Dec. 22, 2017, 36 pages.
Non-Final Office Action in U.S. Appl. No. 15/686,927, dated Jun. 11, 2019, 12 pages.
Non-Final Office Action in U.S. Appl. No. 15/852,833, dated May 31, 2019, 11 pages.
Final Office Action in U.S. Appl. No. 15/832,448, dated Sep. 30, 2019, 18 pages.
Final Office Action in U.S. Appl. No. 15/686,927, dated Oct. 2, 2019, 7 pages.
Final Office Action in U.S. Appl. No. 15/852,833, dated Oct. 3, 2019, 12 pages.
Final Office Action in U.S. Appl. No. 15/686,934, dated Oct. 16, 2019, 9 pages.
Non-Final Office Action in U.S. Appl. No. 15/686,927, dated Jan. 7, 2020, 10 pages.
Non-Final Office Action in U.S. Appl. No. 15/832,448, dated Apr. 15, 2020, 18 pages.
Non-Final Office Action in U.S. Appl. No. 15/852,833, dated Apr. 17, 2020, 12 pages.
Final Office Action in U.S. Appl. No. 15/832,448, dated Oct. 28, 2020, 19 pages.
Notice of Allowance in U.S. Appl. No. 15/686,927, dated Feb. 24, 2021, 6 pages.
Non-Final Office Action in U.S. Appl. No. 15/832,448, dated May 7, 2021, 21 pages.
Notice of Allowance in U.S. Appl. No. 15/686,927, dated Jun. 8, 2021, 6 pages.
Office Action in Korean Patent Application No. 10-2020-7019190, dated Nov. 4, 2021, 11 pages.
Non-Final Office Action in Japanese Patent Application No. 2020-517896, dated Jul. 26, 2022, 14 pages.
Radhakrishna, Rakesh Kappoorkuruppath Valappil, "Cross Layer Design for Video Streaming Over 4G Networks using SVC", Master's Thesis, 2012, pp. 18-24, 51-59, https://ruor.uottawa.ca/bitstream/10393/22657/1/Kappoorkuruppath_Valappil_Radhakrishna_Rakesh_2012_thesis.pdf.

\* cited by examiner

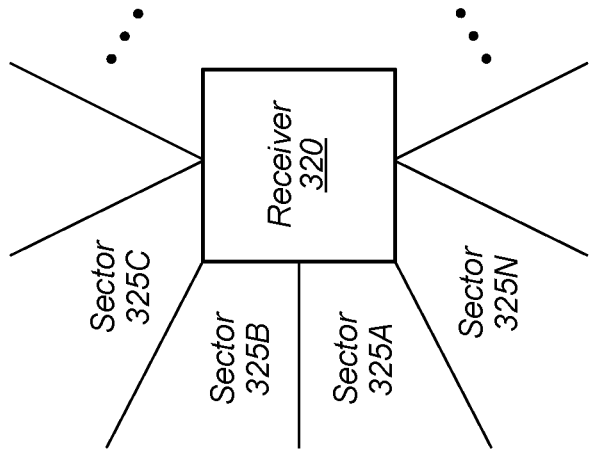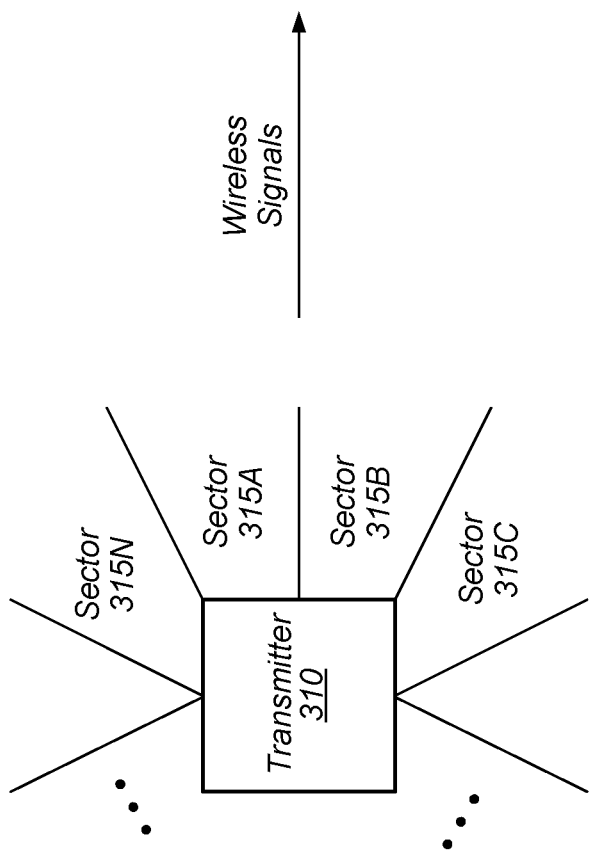
FIG. 3

ADJUSTABLE MODULATION CODING SCHEME TO INCREASE VIDEO STREAM ROBUSTNESS

BACKGROUND

Description of the Related Art

A wireless communication link can be used to send a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application and typically only buffers a small amount of video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user viewing experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which:

FIG. 3 is a diagram of one embodiment of transmit and receive beamforming sectors.

DETAILED DESCRIPTION OF EMBODIMENTS

Figure 1:
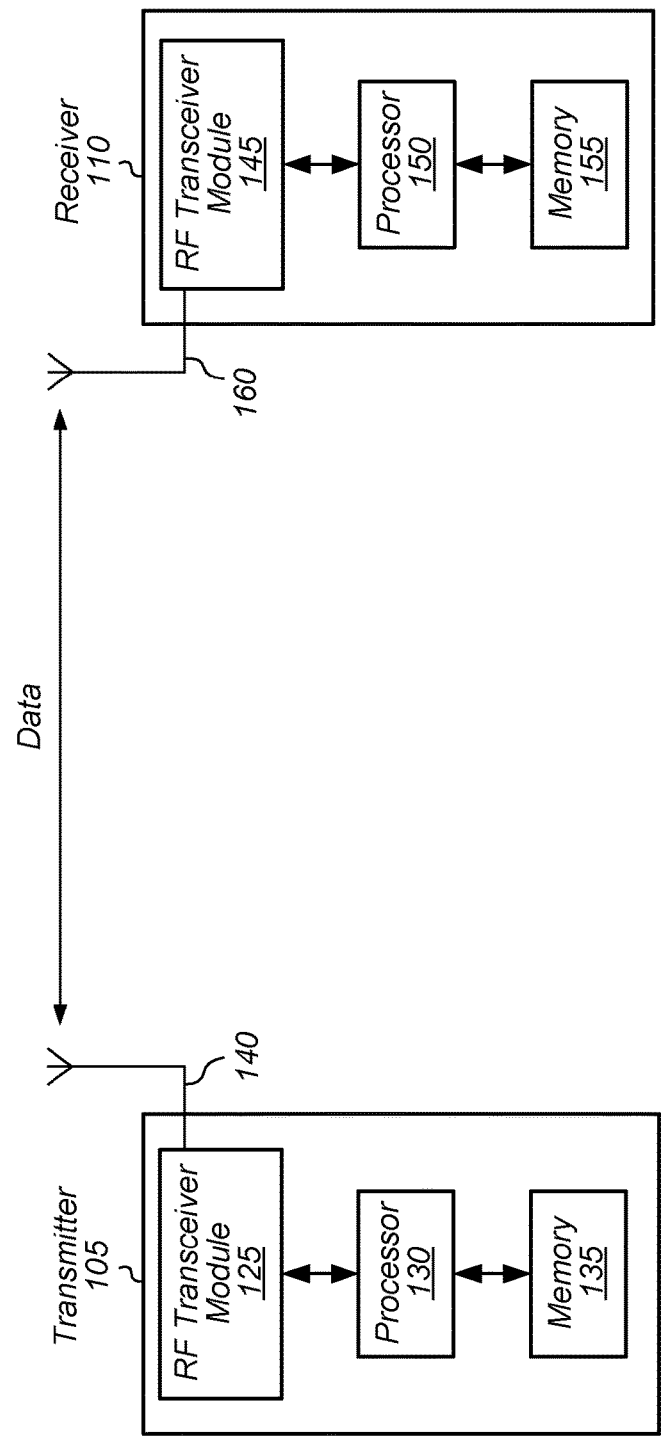
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for utilizing different modulation coding schemes (MCSs) for different components of a video stream are disclosed herein. In one embodiment, a wireless communication system includes a transmitter and a receiver communicating over a wireless link. In one embodiment, the transmitter is configured to encode a video stream and wirelessly transmit the encoded video stream to the receiver. In one embodiment, the video stream is part of a virtual reality (VR) rendered environment.

In one embodiment, the transmitter splits the video stream into a plurality of components and then the transmitter modulates the different components using different MCS levels. The technique utilized by the transmitter for splitting the video stream into a plurality of components can vary from embodiment to embodiment. In one embodiment, the transmitter utilizes successive compression to split the video stream into a lower quality substream and one or more successively higher quality substreams. The number of higher quality sub streams can vary according to the embodiment. Each higher quality substream will require the successful reception of all of the lower quality substreams to be successfully decoded. The higher quality substreams are effectively incremental enhancements to the lower quality substreams. The transmitter modulates the low quality substream using a relatively low MCS level. This relatively low MCS level is a robust MCS which increases the likelihood that the low quality substream is received by the receiver. If only the low quality substream is received by the receiver, then the receiver is able to reconstruct a video frame from this substream only, which avoids a glitch in the display of the video sequence. The successively higher quality substreams are modulated with successively higher MCS levels.

In another embodiment, the transmitter splits the video stream into a plurality of components based on frequency information. In other embodiments, the transmitter can utilize other techniques to split the video stream into a plurality of components. It is noted that a "component" of a video stream can also be referred to as a "substream" or "subset bitstream" herein. In one embodiment, the transmitter splits the video stream into a low frequency component, a medium frequency component, and a high frequency component. In this embodiment, the transmitter modulates the low frequency component using a relatively low MCS level. This relatively low MCS level is a robust MCS which increases the likelihood that the low frequency component is received by the receiver. Also, in this embodiment, the medium frequency component is modulated using a relatively average MCS level and the high frequency component is modulated using a relatively high MCS level. If only the low frequency component is received by the receiver, then the receiver reconstructs a low frequency video frame from this component, which avoids a glitch in the display of the video sequence.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the optimal transmit and receive antenna combinations for wireless data transmission.

In one embodiment, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure.

Transmitter 105 and receiver 110 are representative of any type of communication devices and/or computing devices. For example, in various embodiments, transmitter 105 and/or receiver 110 can be a mobile phone, tablet, computer, server, head-mounted display (HMD), television, another type of display, router, or other types of computing or communication devices. In one embodiment, system 100 executes a virtual reality (VR) application for wirelessly transmitting frames of a rendered virtual environment from transmitter 105 to receiver 110. In other embodiments, other types of applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are analogous to the components described above for transmitter 105. It should be understood that receiver 110 can also include or be coupled to other components (e.g., a display).

In various embodiments, the link between transmitter 105 and receiver 110 has capacity characteristics that fluctuate with variations in the environment. To combat the fluctuating capacity characteristics of the link, transmitter 105 is configured to separate a data stream into multiple components and transmit each component using a different modulation coding scheme (MCS). For example, in one embodiment, the data stream is encoded into a high priority component and one or more lower priority components. The high priority component is the component which transmitter 105 modulates with a robust MCS to increase the likelihood that this component is received by receiver 110.

In one embodiment, the data stream is a video stream, and the video stream is split into a plurality of substreams using successive compression. In one embodiment, the lowest quality substream (i.e., high priority substream) is modulated using a robust MCS level (i.e., low MCS level) to increase the likelihood that the lowest quality substream is received by receiver 110. The other substreams of higher quality are sent to receiver 110 using relatively less robust MCS levels (i.e., relatively high MCS level). Due to robust coding, receiver 110 likely receives the lowest quality substream in the worst case, and receiver 110 is able to reconstruct a lower quality (i.e., lower resolution) video frame from this substream, which prevents a glitch in the user viewing experience.

In one embodiment, the data stream is a video stream, and the video stream is split into a plurality of substreams based on frequency information. For example, in one embodiment, the video stream is split into a low frequency version of the video (i.e., the high priority stream), a medium frequency version of the video (i.e., the medium priority stream), and a high frequency version of the video (i.e., the low priority stream). In some cases, it is preferable that at least the low frequency version of the video is received by receiver 110. In this way, receiver 110 can avoid glitches when displaying the received video even if the high and medium frequency versions of the video are not received. The scheme of splitting the video stream into separate components which are modulated differently allows for robust communication over a lossy channel between transmitter 105 and receiver 110.

The high priority component can also be referred to as a low frequency component, low quality component, or low bitrate component. Similarly, the medium priority component can also be referred to as a medium frequency component, medium quality component, or medium bitrate component. Also, the low priority component can also be referred to as a high frequency component, high quality component, or high bitrate component. It is noted that the term "component" can also be used interchangeably with "stream", "elements", or "subset bitstream" in relation to the above terms.

In one embodiment, pre-compression data is processed multiple times to produce separate lower quality/bitrate and higher quality/bitrate streams, with the higher-quality stream being a derivation of the lower-quality stream. The process is a successive approximation which is not limited to two streams of lower/higher-quality but can also be used to generated N streams of different qualities/bitrates. In one embodiment, the video stream is processed with a first compression ratio to produce a lower bitrate stream. In this embodiment, a higher bitrate stream is generated from the delta of the lower bitrate stream and the original stream at a second lower compression ratio. In another embodiment, alternatively coded information such as motion vectors can be sent in a lower-bitrate, higher-resilience stream.

The lower quality stream can be modulated with a relatively lower MCS level to increase the probability that the lower quality stream is received by receiver 110. The medium quality stream can be modulated with a medium MCS level and the higher quality stream can be modulated with a relatively higher MCS level. It is noted that a "MCS level" can also be referred to as a "MCS index". In one embodiment, a lower MCS level, which has a higher reliability, would transport the lower-frequency, lower-quality information with the MCS level fixed based up on the targeted reliability and expected bandwidth requirement of the data. In this embodiment, the higher-frequency, higher-quality information is transmitted on a MCS level based upon the compression settings which are selected to fit the available bandwidth and/or based upon the capacity of the established link.

In one embodiment, with the lower-frequency, lower-quality stream and the higher-frequency, higher-quality stream having independent compression settings, each stream can be mapped to a different MCS level. In this embodiment, the MCS level for a given stream is selected based on risk, resilience, and quality factors where higher resiliency is achieved with a lower MCS level but with a lower quality. Also, lower resiliency and higher quality is achieved with a higher MCS level. By splitting the video stream into lower-frequency and higher-frequency streams, a higher level of fallback quality is achieved.

Figure 2:
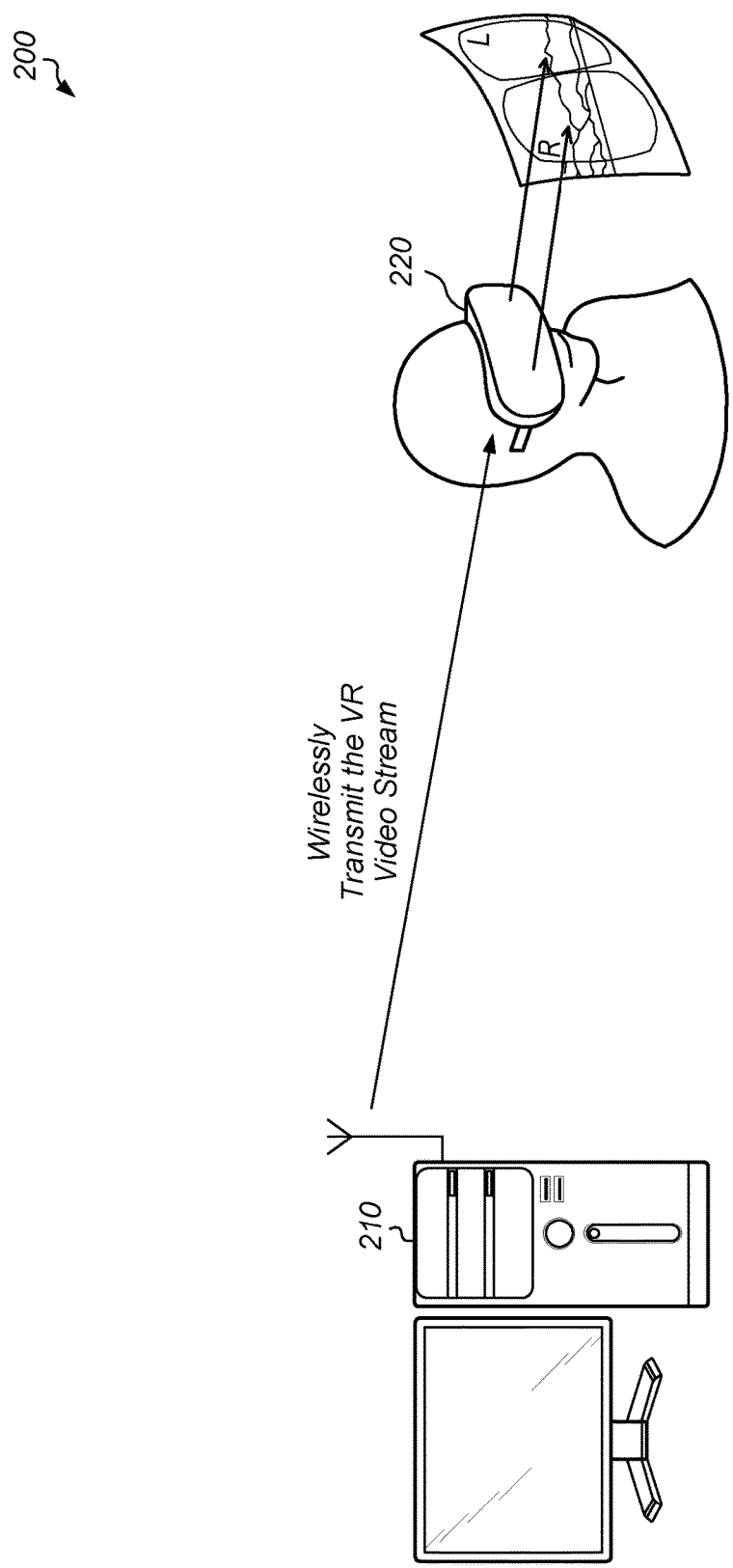
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 can be a gaming console, smart phone, set top box, television set, video streaming device, wearable device, a component of a theme park amusement ride, or otherwise. Also, in other embodiments, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

In one embodiment, after rendering a frame of a virtual environment video stream, computer 210 splits the rendered frame into N components and then sends the N components wirelessly to HMD 220. Each of the N components represents the video at a different frequency, bitrate, quality, and/or resolution, and computer 210 uses a different modulation to modulate each of the different components. In one embodiment, the components are transmitted as physical layer convergence procedure (PLCP) protocol data units (PPDUs). In some embodiments, the three components are combined in an aggregate PPDU (A-PPDU). A PPDU begins with a short training field (STF), followed by a header and then a payload. Typically, there is an inter frame space (IFS) field in between separate payloads. In one embodiment, each of the components is encapsulated into a different payload of an A-PPDU, and then the A-PPDU is sent from computer 210 to HMD 220.

In one embodiment, the goal is to send the component representing the low frequency/bitrate/quality video using a more reliable modulation coding scheme (MCS) to increase the likelihood that at least some version of the video frame can be displayed. For example, a low MCS level such as MCS 1 using binary phase shift keying (BPSK) encodes a single bit per symbol and is a robust modulation since it takes a higher amount of noise or distortion to make the demodulator reach an incorrect decision as compared to a less reliable MCS. MCS 1 offers protection against channel errors at the expense of a lower transmission rate. Accordingly, in one embodiment, the low frequency component is modulated using BPSK modulation, the medium frequency component is modulated using quadrature phase shift keying (QPSK) modulation, and a third, high frequency component is modulated using 16 quadrature amplitude modulation (QAM). In other embodiments, the components of the video can be modulated using other MCS levels.

Referring now to FIG. 3, a diagram depicting transmit and receive beamforming sectors is shown. In one embodiment, transmitter 310 is configured to perform each of its directional transmissions towards a respective transmit sector selected from among a plurality of transmit sectors 315A-N. Transmit sectors 315A-N are representative of any number of transmit sectors, with the number varying from embodiment to embodiment. Receiver 320 is configured to perform each of its directional receptions from a respective receive sector selected from among a plurality of receive sectors 325A-N, which are representative of any number of receive sectors.

When communicating with receiver 320, transceiver 310 directionally transmits RF signals toward a selected one of transmit sectors 315A-N. If transceiver 310 transmits signals toward transmit sectors in a direction away from receiver 320, the energy levels of signals received by receiver 320 will be low, preventing receiver 320 from successfully receiving the signals. Otherwise, if transmitter 310 transmits signals to a transmit sector oriented toward receiver 320, signals will arrive at receiver 320 with high levels of energy. For example, if receiver 320 is monitoring receive sector 325A or 325B for incoming transmissions at the same time that a signal arrives from transmitter 310 with high levels of energy, receiver 320 will receive the signal with a high level of power, enabling receiver 320 to successfully extract the data from the signal.

During beamforming training, transmitter 310 and receiver 320 each cycle through the different sectors to determine the best configuration for transmitting data from transmitter 310 to receiver 320. If one or both of transmitter 310 and receiver 320 are mobile, then the best sectors for transmitting data can change over time. Accordingly, transmitter 310 and receiver 320 can repeat the beamforming training procedure at periodic intervals to determine if an alternate configuration would result in a better connection.

Transmitter 310 and receiver 320 are configured to reinitiate the beamforming training procedure periodically in order to determine whether link quality can be improved by using different beamforming parameters. In one embodiment, transmitter 310 and receiver 320 determine whether to initiate a beamforming training procedure based on a signal-to-noise ratio (SNR) measurement of a received signal over beamformed links, based on a packet reception rate, and/or based on other factors. For example, if the SNR of the received signal is less than a threshold, then transmitter 310 and receiver 320 can schedule and perform a beamforming training procedure. Alternatively, if the packet reception rate falls below a threshold, transmitter 310 and receiver 320 can schedule and perform a beamforming training procedure. In other embodiments, transmitter 310 and receiver 320 perform a beamforming training procedure on a fixed schedule.

In one embodiment, transmitter 310 and receiver 320 can generate a measurement of the link quality during a beamforming training procedure. Then, transmitter 310 can utilize the measurement of the link quality in determining how to modulate the different components of a video signal. For example, if the link quality is high, meaning there is a low probability of losing packets, then transmitter 310 can utilize relatively high (i.e., less robust) MCS levels to modulate the different components of the video signal. On the other hand, if the link quality is low, meaning there is a high probability of losing data, then transmitter 320 can utilize relatively low (i.e., more robust) MCS levels to modulate the different components of the video signal.

Figure 4:
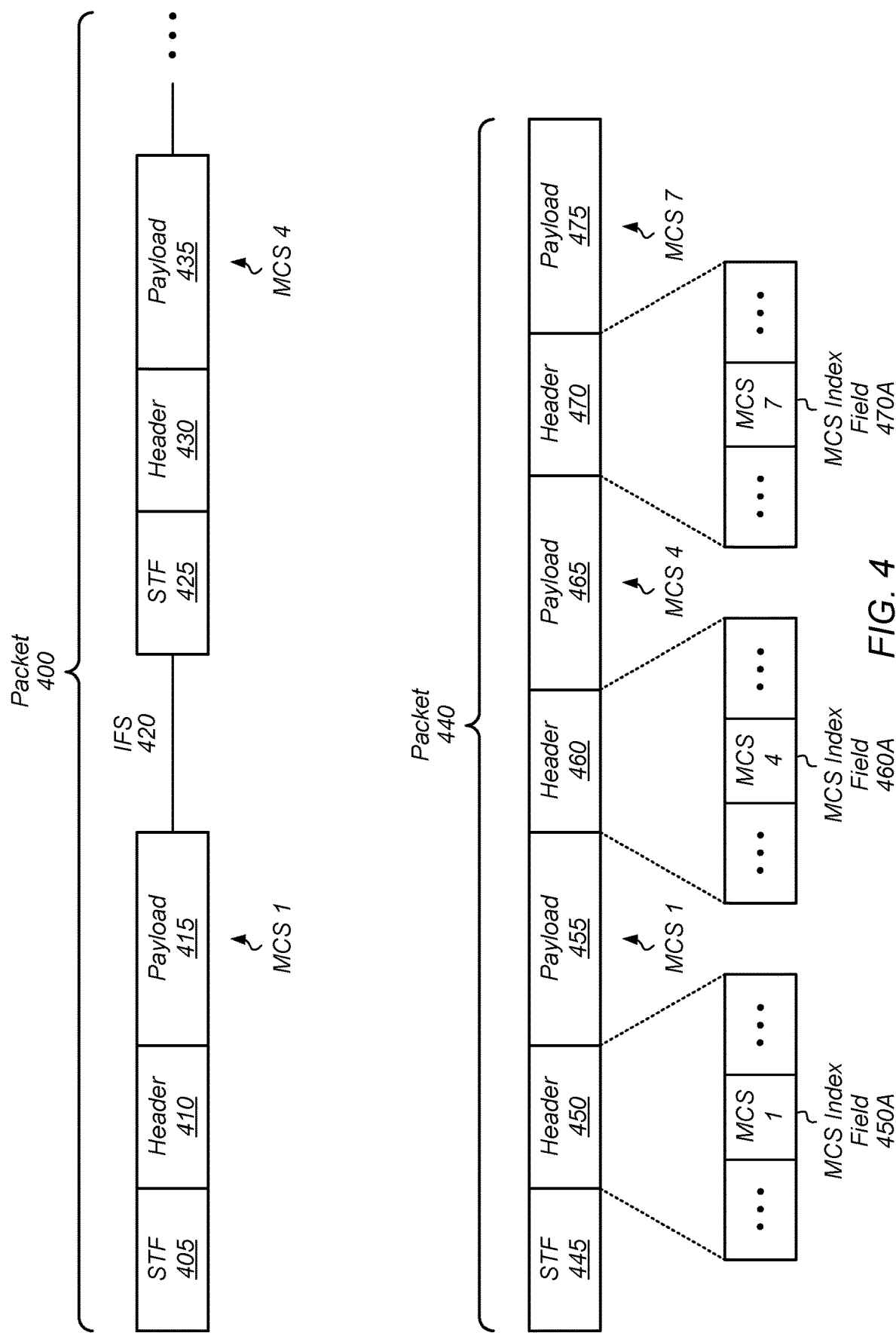
FIG. 4 is a diagram of packets for use in wireless communication in accordance with various embodiments.

Turning now to FIG. 4, diagrams of packets for use in wireless communication in accordance with various embodiments are shown. Packet 400 is one example of a packet which is transmitted wirelessly in accordance with one embodiment. In one embodiment, packet 400 includes short training field (STF) 405 and then after STF 405 is header 410 and then payload 415. STF 405 can be utilized to specify the channel conditions (e.g., channel estimation field) and additional information. STF 405 can also be referred to as a preamble. In one embodiment, payload 415 includes a low frequency/quality component of the video stream and is modulated using MCS 1. Inter-frame space (IFS) 420 follows the payload 415, and then STF 425 is located after IFS 420, followed by header 430 and payload 435. In one embodiment, payload 435 is a medium frequency/quality component of the video stream and is modulated using MCS 4. In one embodiment, header 430 includes a field which specifies the MCS, length, and other information about payload 435. Packet 400 can also include any number of other frames, depending on the embodiment.

In another embodiment, wireless data is sent according to the format shown in packet 440 which includes multiple payloads. For example, packet 440 includes STF 445 followed by header 450 and payload 455. In one embodiment, payload 455 includes the low frequency/quality component of a video stream, and payload 455 is modulated with MCS 1, as indicated by MCS index field 450A of header 450. Packet 440 also includes header 460 back-to-back with payload 455, and with payload 465 following header 460. In one embodiment, payload 465 includes the medium frequency/quality component of a video stream, and payload 465 is modulated with MCS 4, as indicated by MCS index field 460A of header 460.

Also, header 470 is included back-to-back with payload 465, and then payload 475 follows header 470. In one embodiment, payload 475 includes the high frequency/quality component of a video stream, and payload 475 is modulated with MCS 7, as indicated by MCS index field 470A of header 470. Packet 440 aggregates multiple payloads together and does not utilize IFS between a payload and the next header which saves bandwidth. Also, packet 440 does not utilize a STF between a payload and a subsequent header, which saves additional bandwidth. By sending packets using the format of packet 440 and avoiding the use of an IFS and a STF at the start of subsequent payloads, the bandwidth on the channel can be utilized more efficiently. It should be understood that packets 400 and 440 are merely two examples of packet formats that can be utilized in various embodiments. In other embodiments, other packet formats are possible and are contemplated.

Figure 5:
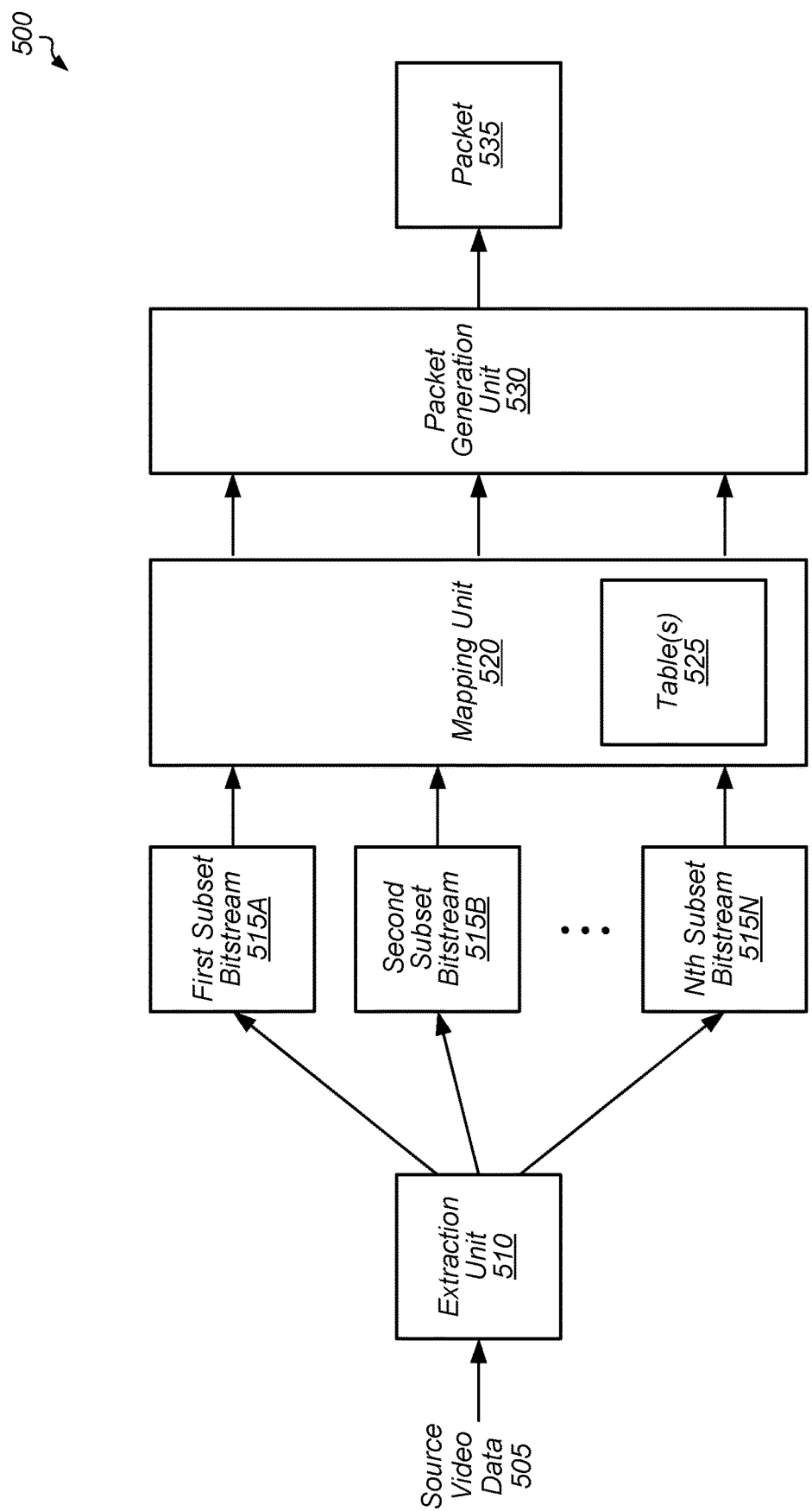
FIG. 5 is a block diagram of one embodiment of transmitter logic.

Referring now to FIG. 5, a block diagram of one embodiment of transmitter logic 500 is shown. Source video data 505 is received by the transmitter, and then source video data 505 is processed by transmitter logic 500 to generate modulated packets for transmission to a receiver (e.g., HMD 220 of FIG. 2). In one embodiment, source video data 505 is initially processed by extraction unit 510. Extraction unit 510 splits source video data 505 into multiple subset bitstreams. In various embodiments, extraction unit 510 splits source video data 505 into N subset bitstreams, wherein N is representative of any integer greater than one, and with the value of N varying from embodiment to embodiment. In one embodiment, extraction unit 510 splits source video data 505 into three subset bitstreams (e.g., low frequency/quality subset bitstream 515A, medium frequency/quality subset bitstream 515B, high frequency/quality subset bitstream 515N). In another embodiment, extraction unit 510 splits source video data 505 into two subset bitstreams (e.g., a high frequency/quality subset bitstream and a low frequency/quality subset bitstream). In other embodiments, extraction unit 510 can split source video data 505 into other numbers of subset bitstreams.

In one embodiment, first subset bitstream 515A corresponds to a low quality subset bitstream. First subset bitstream 515A can also be referred to as a low frequency subset bitstream, low bitrate subset bitstream, or low resolution subset bitstream. The other bitstreams can also be referred to differently by replacing the term "quality" with "frequency", "quality", "bitrate", or "resolution". In one embodiment, extraction unit 510 processes source video data 505 with a high compression ratio to produce a low bitrate subset bitstream 515A. Then, a medium bitrate subset bitstream 515B is generated from the difference of low bitrate subset bitstream 515A and the original source video data 505 at a second lower compression ratio. Other subset bitstreams can be generated in a similar manner.

Figure 6:
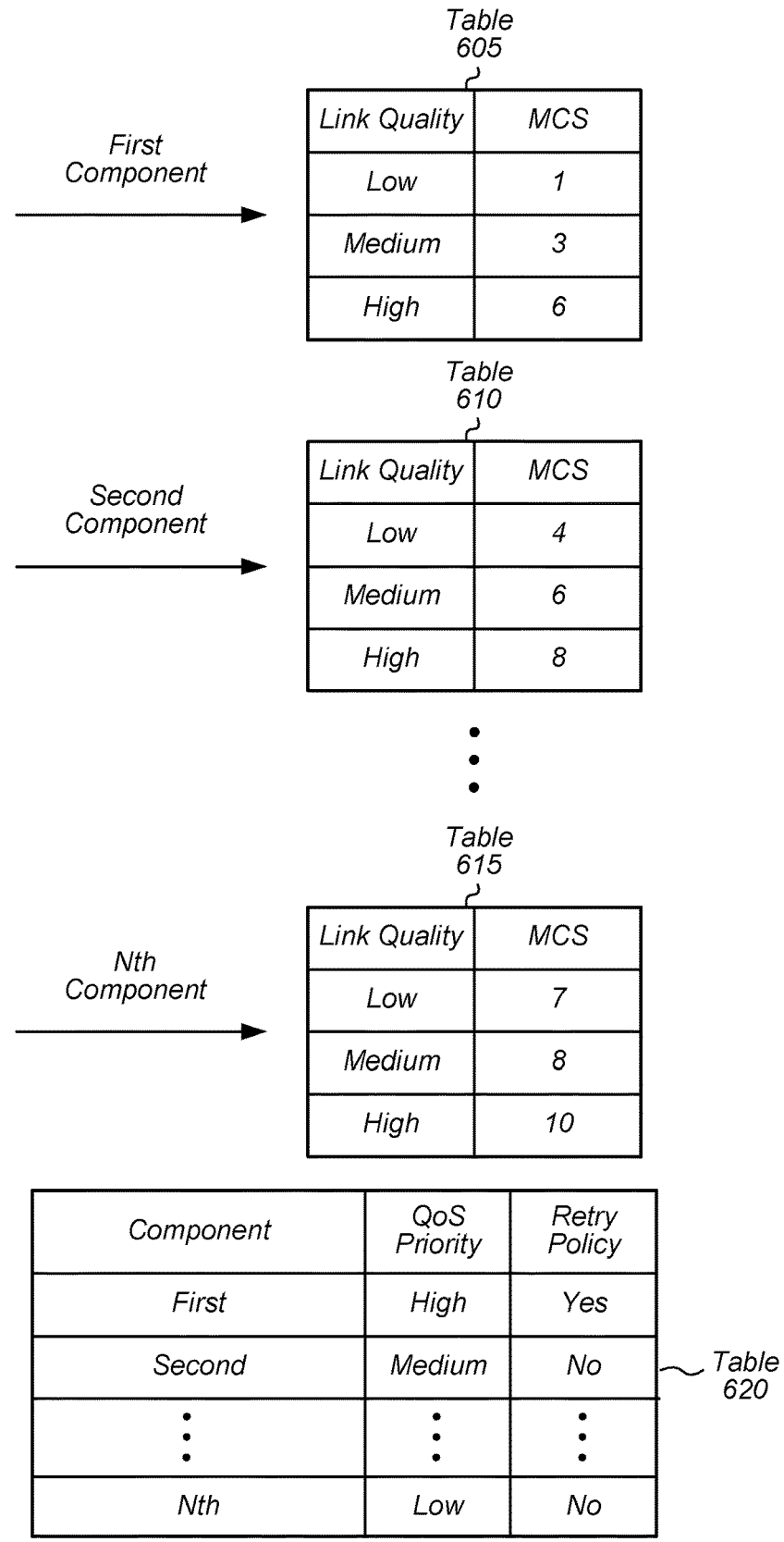
FIG. 6 illustrates tables for mapping components to MCS levels based on link quality in accordance with one embodiment.

Next, mapping unit 520 maps the different subset bitstreams 515A-N to different MCS levels based on table(s) 525. Table(s) 525 are representative of any number and type of tables that are utilized to determine the MCS level for the different subset bitstreams 515A-N. Examples of table(s) 525 are shown in FIG. 6 in accordance with one embodiment. In other embodiments, other table(s) 525 can be utilized to map the different subset bitstreams 515A-N to different MCS levels.

In one embodiment, mapping unit 520 maps first subset bitstream 515A to a low MCS level, with the low MCS level inherently having a high reliability. In one embodiment, a low MCS level is used to transport first subset bitstream 515A with the MCS level chosen based upon the targeted reliability and expected bandwidth requirements of the data. In this embodiment, mapping unit 520 maps subset bitstreams 515B-N to MCS levels based on compression settings which are selected to fit the available bandwidth in the MCS level. The MCS levels for subset bitstreams 515B-N can be selected based upon the capacity of the established link to the receiver.

In one embodiment, with the different subset bitstreams 515A-N having independent compression settings, mapping unit 520 can map each subset bitstream 515A-N to different MCS levels. The MCS levels can be selected based upon risk, resilience, quality analysis, and other factors. Maximum resilience and lowest quality is achieved with the lowest MCS level while minimum resilience and highest quality is achieved with the highest MCS level. In one embodiment, the low frequency/quality first subset bitstream 515A will be mapped to a low quality and high resilience MCS level while the high frequency/quality Nth subset bitstream 515N will be mapped to a high quality and low resilience MCS level. This allows a higher level of fallback quality to be achieved in cases when the high frequency/quality Nth subset bitstream 515N is not received correctly by the receiver.

In one embodiment, packet generation unit 530 is configured to receive the differently modulated subset bitstreams and combine these bitstreams into a single packet 535. Packet 535 can then be sent over the wireless link to the receiver. One example of a single packet 535 for combining multiple differently modulated subset bitstreams is shown as packet 440 (of FIG. 4). Other techniques for combining multiple differently modulated subset bitstreams can be utilized in other embodiments. Also, in other embodiments, the differently modulated subset bitstreams can be sent in separate packets rather than being combined in a single packet.

Referring now to FIG. 6, one embodiment of tables for mapping components to MCS levels based on link quality are shown. In one embodiment, the components which are generated from a given video stream are encoded and then modulation coding scheme (MCS) levels are chosen for the components based on the current link quality. In one embodiment, the video stream is split into multiple components based on successive compression. In another embodiment, the video stream is split into multiple components based on frequency information. For example, in one embodiment, the video stream is split into a low frequency component, a medium frequency component, and a high frequency component. It should be understood that in other embodiments, the video stream can be split into other numbers of components. In one embodiment, the MCS levels selected for the components can have a fixed relationship between each other. For example, the low frequency/quality component will have a relatively low MCS, the medium frequency/quality will have a relatively average MCS, and the high frequency/quality component will have a relatively high MCS.

In one embodiment, the MCS levels of the different components are scaled based on the link quality of the wireless link between the transmitter and the receiver. The link quality can be measured using any suitable techniques. For example, the link quality can be measured based on a received signal strength, a signal-to-noise ratio (SNR) of a received signal, a received packet error rate, and/or other factors. In one embodiment, the link quality is measured during a beamforming training procedure. The tables 605, 610, and 615 are meant to illustrate examples of how to determine MCS levels for modulating components based on the link quality. In one embodiment, each individual component has a different table. In other embodiments, other techniques for mapping each component to a MCS level based on link quality can be utilized.

In one embodiment, table 605 is utilized to determine the MCS level for the first component of the video stream. For example, if the link quality is low (i.e., less than a low threshold), the first component is modulated using MCS 1. If the link quality is mediocre (i.e., in between low and high thresholds), then the first component is modulated using MCS 3. Otherwise, if the link quality is high (i.e., greater than a high threshold), then the first component is modulated using MCS 6. The other components are mapped to MCS levels from low to high in a similar fashion as the link quality changes from low (i.e., bad) to high (i.e., good).

It should be understood that the link quality can be partitioned into other numbers of ranges than the three shown in tables 605, 610, and 615. It should also be understood that the MCS levels shown in tables 605, 610, and 615 are indicative of one particular embodiment. In other embodiments, the different components can be mapped to other MCS levels than those shown in tables 605, 610, and 615.

Additionally, table 620 is shown in FIG. 6 as one example of a table which is utilized to determine a given quality of service (QoS) priority and a given retry policy for each component of the video signal. For example, in one embodiment, the first component will be assigned a high QoS priority and will be retried if the first component is not received. Also, in this embodiment, the second component will be assigned a medium QoS priority and will not be retried, and the Nth component will be assigned a low QoS priority and will not be retried. In other embodiments, other QoS priorities and retry policies can be assigned to the different video stream components.

Figure 7:
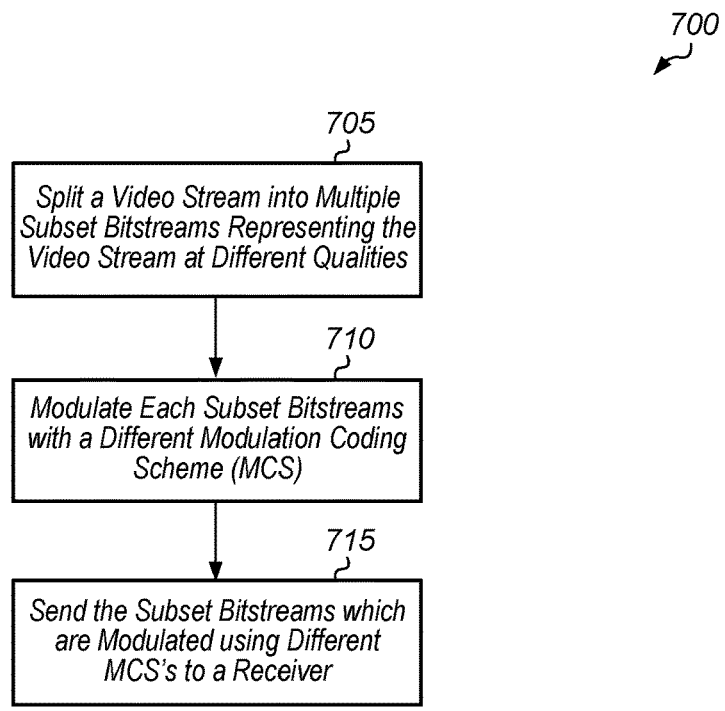
FIG. 7 is a generalized flow diagram illustrating one embodiment of a method for splitting a video stream into multiple components and using different modulation for the different components.
Figure 8:
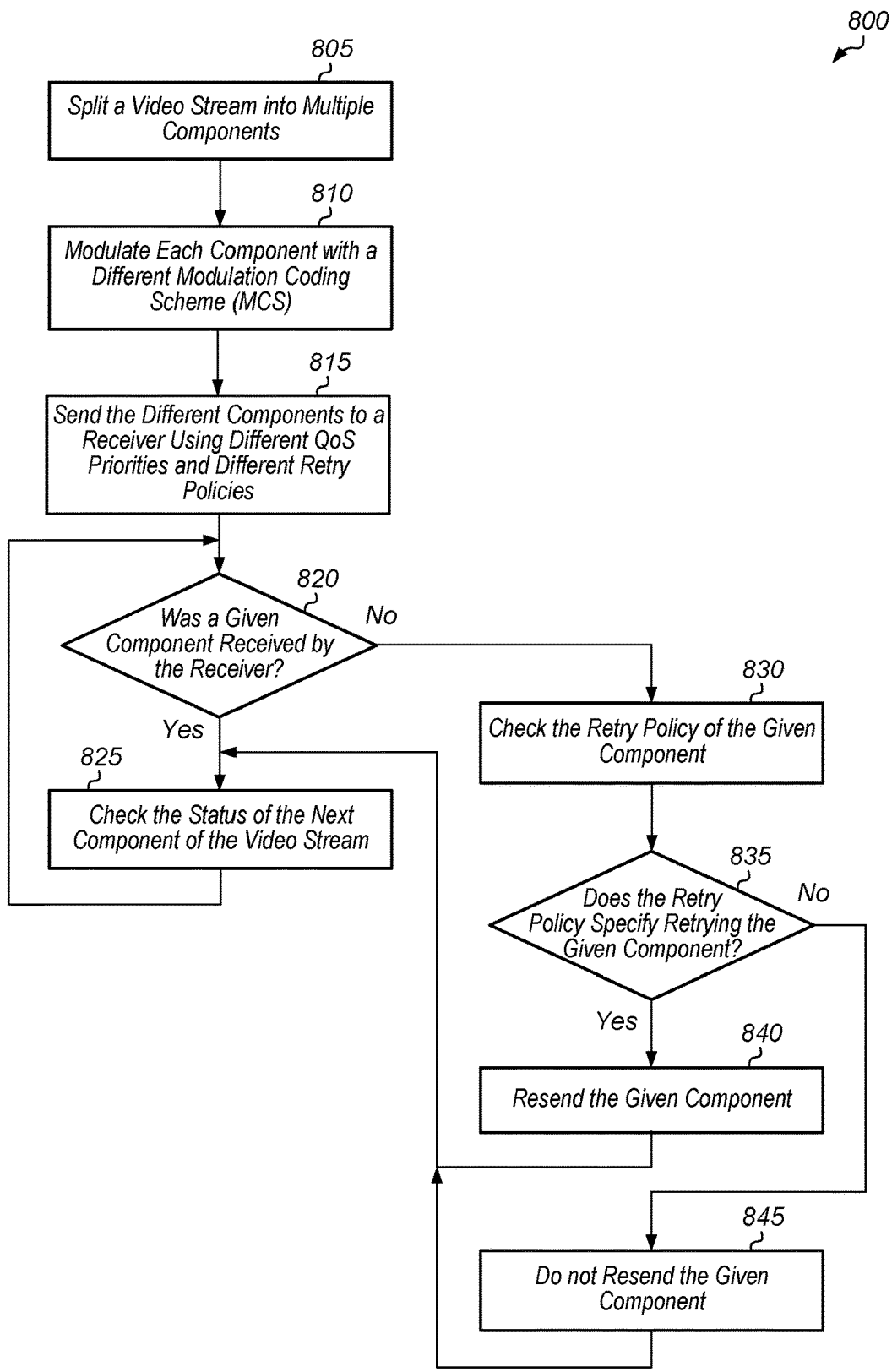
FIG. 8 is a generalized flow diagram illustrating another embodiment of a method for utilizing different retry policies for different components of a video stream.
Figure 9:
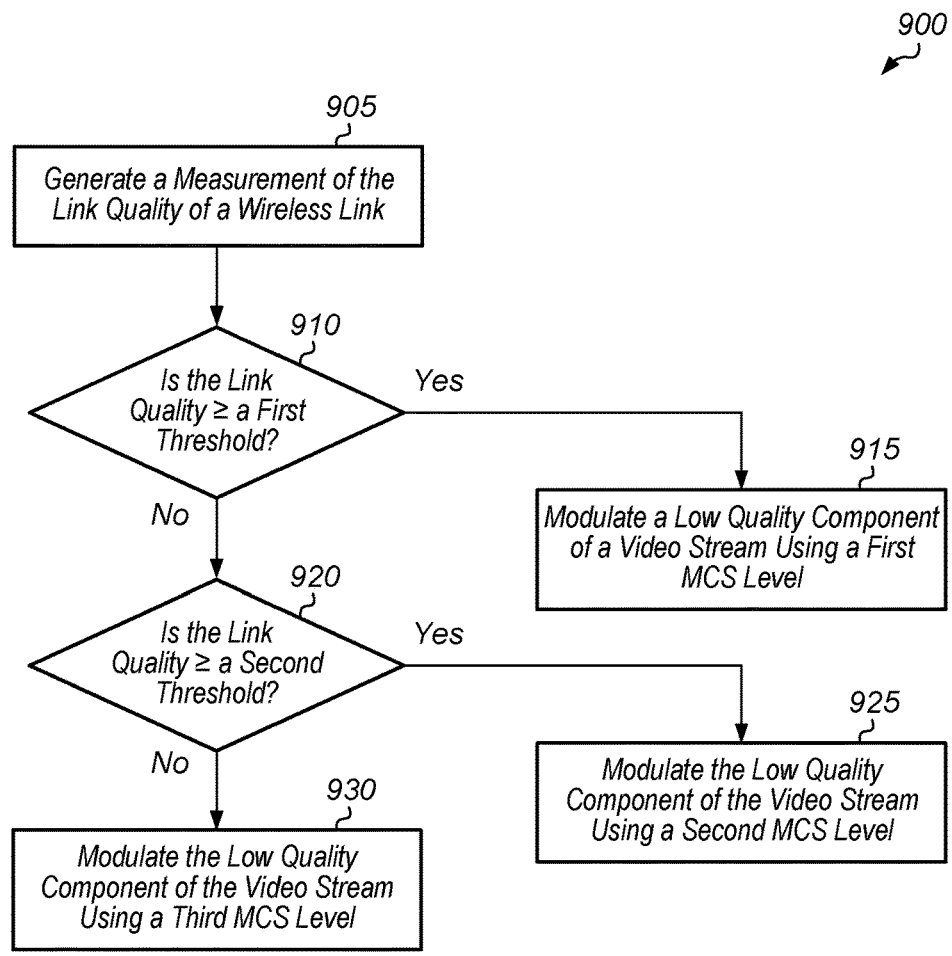
FIG. 9 is a generalized flow diagram illustrating one embodiment of a method for determining a MCS level for a low quality component based on link quality.

Turning now to FIG. 7, one embodiment of a method 700 for splitting a video stream into multiple components and using different modulations for different components is shown. For purposes of discussion, the steps in this embodiment and those of FIG. 8-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A transmitter splits a video stream into multiple subset bitstreams representing the video stream at different quality levels (block 705). The transmitter can be any type of computing device, with the type of computing device varying according to the embodiment. In one embodiment, the transmitter renders the video stream as part of a virtual reality (VR) environment. In other embodiments, the video stream can be generated for other environments. In one embodiment, the transmitter splits the video stream into multiple subset bitstreams using successive compression. In another embodiment, the transmitter splits the video stream into multiple subset bitstreams based on frequency information.

Next, the transmitter modulates each subset bitstream with a different modulation coding scheme (MCS) (block 710). Then, the transmitter sends the subset bitstreams which are modulated using different MCS's to a receiver (block 715). For example, in one embodiment, a first subset bitstream, representative of the video stream at a low quality and at a lower level of detail, is sent using a robust MCS. If only the first subset bitstream is received by the receiver, the receiver is able to reconstruct a video frame, albeit at a low level of detail, and display the video frame to the user such that the video frame is understood by the user. Accordingly, the transmitter prioritizes the first subset bitstream and modulates the first subset bitstream using a robust MCS to increase the likelihood that the first subset bitstream if received by the receiver. In this embodiment, a second subset bitstream, representative of the video stream at a medium quality and at a medium level of detail, is sent using a MCS of average reliability. Also in this embodiment, a third subset bitstream, representative of the video stream at a high quality and at a high level of detail, is sent using a relatively less reliable MCS compared to the MCS's used for the other subset bitstreams. In other embodiments, other suitable techniques for modulating the different subset bitstreams can be implemented. After block 715, method 700 ends. The receiver can be any type of computing device. In one embodiment, the receiver is a head-mounted display (HMD). In other embodiments, the receiver can be other types of computing devices.

Referring now to FIG. 8, one embodiment of a method 800 for utilizing different retry policies for different components of a video stream is shown. A transmitter splits a video stream into multiple components (block 805). In one embodiment, the transmitter splits the video stream into a low quality component, a medium quality component, and a high quality component. In other embodiments, the transmitter can split the video stream into other numbers and types of components. The transmitter modulates each component with a different modulation coding scheme (MCS) (block 810). Then, the transmitter sends the different components to a receiver using different QoS priorities and different retry policies (block 815).

If the transmitter determines that a given component was received by the receiver (conditional block 820, "yes" leg), then the transmitter checks the status of the next component of the video stream (block 825). In one embodiment, the transmitter determines that the receiver received the given component if the receiver acknowledged the given component. If the given component was not received by the receiver (conditional block 820, "no" leg), then the transmitter checks the retry policy of the given component (block 830). For example, in one embodiment, a retry policy can specify that the low quality component should be retried while the medium and high quality components are not retried. In other embodiments, other retry policies can be implemented.

If the retry policy specifies that the given component should be retried (conditional block 835, "yes" leg), then the transmitter resends the given component (block 840). If the given component should not be retried based on its retry policy (conditional block 835, "no" leg), then the transmitter does not resend the given component (block 845). After blocks 840 and 845, the transmitter checks the status of the next component (block 825).

Turning now to FIG. 9, one embodiment of a method 900 for determining a MCS level for a low quality component based on the link quality is shown. A transmitter and/or a receiver generates a measurement of the link quality of a wireless link (block 905). In one embodiment, the link quality is measured during the implementation of one or more beamforming training procedures. Next, the transmitter and/or the receiver determines if the link quality is greater than or equal to a first threshold (conditional block 910). If the link quality is greater than or equal to the first threshold, then this indicates that the link quality is relatively high. If the link quality is greater than or equal to the first threshold (conditional block 910, "yes" leg), then the transmitter modulates a low quality component of a video stream using a first MCS level (block 915). In one embodiment, the first MCS level is MCS 6 (i.e., 16 QAM). In other embodiments, the first MCS level can be other levels.

Next, if the link quality is less than the first threshold (conditional block 910, "no" leg), then the transmitter determines if the link quality is greater than or equal to a second threshold (conditional block 920). If the link quality is less than the first threshold but greater than or equal to the second threshold, then this indicates that the link quality is mediocre. It is noted that the first, second, and third thresholds are adjustable and can be reprogrammed from time to time. If the link quality is greater than or equal to the second threshold (conditional block 920, "yes" leg), then the transmitter modulates the low quality component using a second MCS level (block 915). It is assumed for the purposes of this discussion that the second MCS level is less than (i.e., more reliable than) the first MCS level. In one embodiment, the second MCS level is MCS 3 (i.e., QPSK). In other embodiments, the second MCS level can be other levels.

If the link quality is less than the second threshold (conditional block 920, "no" leg), then the transmitter modulates the low quality component using a third MCS level (block 925). If the link quality is less than the second threshold, then this indicates that the link quality is relatively poor. It is assumed for the purposes of this discussion that the third MCS level is less than the first and second MCS levels. In one embodiment, the third MCS level is MCS 1 (i.e., BPSK). In other embodiments, the third MCS level can be other levels. After blocks 915, 925, and 930, method 900 ends. It is noted that other similar methods can be implemented to determine how to modulate the other components generated from the video stream. It is also noted that in other embodiments, the link quality can be compared to other numbers of thresholds for determining which MCS level to use when modulating a given component of the video stream.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming; language, such as C. Alternatively, a hardware design language (HDL) such as Verilog can be used.

In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a transmitter;
 wherein the transmitter is configured to:
  split a video stream into a plurality of subset bitstreams, wherein each of the plurality of subset bitstreams represents a different quality of the video stream with higher quality subset bitstreams representing enhancements to lower quality subset bitstreams;
  modulate each subset bitstream of the plurality of subset bitstreams with a different modulation coding scheme (MCS) level, wherein an MCS selected for each given subset bitstream is based at least in part on a quality of the given subset bitstream;
  aggregate two or more modulated subset bitstreams of the plurality of subset bitstreams in a single packet for transmission via a wireless network, wherein the single packet comprises at least a first header that identifies a first MCS level and a second header that identifies a second MCS level different than the first MCS level; and
  transmit each modulated subset bitstream.

2. The system as recited in claim 1, wherein the transmitter is further configured to:
 modulate a first subset bitstream with a first MCS level of a plurality of MCS levels; and
 modulate a second subset bitstream with a second MCS level, wherein the second MCS level is a relatively less reliable MCS level than the first MCS level.

3. The system as recited in claim 2, wherein:
 the first subset bitstream represents the video stream at a first quality level; and
 the second subset bitstream represents the video stream at a second quality level, wherein the second quality level is a relatively higher quality than the first quality level.

4. The system as recited in claim 1, wherein decoding of a given higher quality subset bitstream requires successful reception of all lower quality subset bitstreams.

5. The system as recited in claim 4, wherein the transmitter is configured to:
 modulate a lower frequency subset bitstream with a first MCS level responsive to determining a measurement of link quality is greater than or equal to a first threshold; and
 modulate the lower frequency subset bitstream with a second MCS level responsive to determining the measurement of link quality is less than the first threshold, wherein the first MCS level is less reliable than the second MCS level.

6. The system as recited in claim 1, wherein the single packet comprises at least a first payload corresponding to the first header and comprising data coded according to a first modulation coding scheme, and a second payload corresponding to the second header and comprising data coded according to a second modulation coding scheme different than the first modulation coding scheme.

7. The system as recited in claim 6, wherein the single packet is an aggregate physical layer convergence procedure (PLCP) protocol data units (PPDU) physical layer packet.

8. A method comprising:
 splitting a video stream into a plurality of subset bitstreams, wherein each of the plurality of subset bitstreams represents a different quality of the video stream with higher quality subset bitstreams representing enhancements to lower quality subset bitstreams;
 modulating each subset bitstream of the plurality of subset bitstreams with a different modulation coding scheme (MCS) level, wherein an MCS selected for each given subset bitstream is based at least in part on a quality of the given subset bitstream;
 aggregating two or more modulated subset bitstreams of the plurality of subset bitstreams in a single packet for transmission via a wireless network, wherein the single packet comprises at least a first header that identifies a first MCS level and a second header that identifies a second MCS level different than the first MCS level; and
 transmitting each modulated subset bitstream to a receiver.

9. The method as recited in claim 8, further comprising:
 modulating a first subset bitstream with a first MCS level of a plurality of MCS levels; and
 modulating a second subset bitstream with a second MCS level, wherein the second MCS level is a relatively less reliable MCS level than the first MCS level.

10. The method as recited in claim 9, wherein:
 the first subset bitstream represents the video stream at a first quality level; and
 the second subset bitstream represents the video stream at a second quality level, wherein the second quality level is a relatively higher quality than the first quality level.

11. The method as recited in claim 8, wherein decoding of a given higher quality subset bitstream requires successful reception of all lower quality subset bitstreams.

12. The method as recited in claim 11, further comprising:
modulating a lower frequency subset bitstream with a first MCS level responsive to determining a measurement of link quality is greater than or equal to a first threshold; and
modulating the lower frequency subset bitstream with a second MCS level responsive to determining the measurement of link quality is less than the first threshold, wherein the first MCS level is less reliable than the second MCS level.

13. The method as recited in claim 12, further comprising modulating the lower frequency subset bitstream with a third MCS level responsive to determining the measurement of link quality is less than a second threshold, wherein the second MCS level is less reliable than the third MCS level.

14. The method as recited in claim 8, wherein the single packet is an aggregate physical layer convergence procedure (PLCP) protocol data units (PPDU) physical layer packet that comprises at least a first payload corresponding to the first header and comprising data coded according to a first modulation coding scheme, and a second payload corresponding to the second header and comprising data coded according to a second modulation coding scheme different than the first modulation coding scheme.

15. An apparatus comprising:
a processor;
a radio frequency (RF) transceiver module;
wherein the apparatus is configured to:
split a video stream into a plurality of subset bitstreams, wherein each subset bitstream of the plurality of subset bitstreams represents a different range of components of the video stream;
modulate each subset bitstream of the plurality of subset bitstreams with a different modulation coding scheme (MCS) level, wherein each of the plurality of subset bitstreams represents a different quality of the video stream with higher quality subset bitstreams representing enhancements to lower quality subset bitstreams;
aggregate two or more modulated subset bitstreams of the plurality of subset bitstreams in a single packet for transmission via a wireless network, wherein the single packet comprises at least a first header that identifies a first MCS level and a second header that identifies a second MCS level different than the first MCS level; and
transmit each modulated subset bitstream.

16. The apparatus as recited in claim 15, wherein the apparatus is further configured to:
modulate a first subset bitstream with a first MCS level of a plurality of MCS levels; and
modulate a second subset bitstream with a second MCS level, wherein the second MCS level is a relatively less reliable MCS level than the first MCS level.

17. The apparatus as recited in claim 16, wherein:
the first subset bitstream represents the video stream at a first quality level; and
the second subset bitstream represents the video stream at a second quality level, wherein the second quality level is a relatively higher quality than the first quality level.

18. The apparatus as recited in claim 15, wherein decoding of a given higher quality subset bitstream requires successful reception of all lower quality subset bitstreams.

19. The apparatus as recited in claim 18, wherein the apparatus is configured to:
modulate a lower frequency subset bitstream with a first MCS level responsive to determining a measurement of link quality is greater than or equal to a first threshold; and
modulate the lower frequency subset bitstream with a second MCS level responsive to determining the measurement of link quality is less than the first threshold, wherein the first MCS level is less reliable than the second MCS level.

20. The apparatus as recited in claim 19, wherein the apparatus is configured to modulate the lower frequency subset bitstream with a third MCS level responsive to determining the measurement of link quality is less than a second threshold, wherein the second MCS level is less reliable than the third MCS level.

* * * * *